United States Patent [19]

Asada et al.

[11] Patent Number: 4,796,151

[45] Date of Patent: Jan. 3, 1989

[54] IGNITION SYSTEM FOR VEHICLE

[75] Inventors: Toru Asada, Takaoka; Kenichi Komuro, Toyota; Ryoichi Fukumoto, Nagoya; Nozomu Torii, Hekinan, all of Japan

[73] Assignee: Aisin Seiki Kabushikikaisha, Japan

[21] Appl. No.: 122,809

[22] Filed: Nov. 19, 1987

Related U.S. Application Data

[63] Continuation of Ser. No. 842,683, Mar. 21, 1986, abandoned.

[30] Foreign Application Priority Data

Mar. 22, 1985 [JP] Japan .................................. 60-58109

[51] Int. Cl.⁴ ....................... H01H 47/00; B62D 45/00

[52] U.S. Cl. ............................... 361/171; 340/825.31; 307/10 AT

[58] Field of Search ............................... 361/171, 172; 307/10 AT; 123/198 B; 340/825.31, 825.32

[56] References Cited

U.S. PATENT DOCUMENTS

| | | | |
|---|---|---|---|
| 3,544,804 | 12/1970 | Gaumer et al. | 361/171 |
| 3,720,284 | 3/1973 | Myers | 307/10 AT |
| 4,141,332 | 2/1979 | Wyler | 123/198 B |
| 4,477,874 | 10/1984 | Ikuta et al. | 307/10 AT |
| 4,509,093 | 4/1985 | Stellberger | 361/172 |

*Primary Examiner*—L. T. Hix
*Assistant Examiner*—David M. Gray
*Attorney, Agent, or Firm*—Sughrue, Mion, Zinn, Macpeak and Seas

[57] ABSTRACT

An ignition system for vehicle includes switching means which is turned on in response to a given code input. The switching means may be connected in a supply line which provides a connection between a primary coil of an ignition circuit and a storage battery mounted on a vehicle, in a ground line which provides a connection between the primary coil and the electrical ground of a vehicle, or in an energization control line which provides a connection between the base of a switching transistor, acting to pass or interrupt the primary current flow, and its associated base driver, each line being disposed in an ignition circuit. The code may be entered through numerical keys, a combination of a key code emitter and a key code receiver, or a combination of a key card and a card reader. The ignition circuit is completed by allowing the switching means to be turned on only when a code entered matches a specific code which is previously stored.

3 Claims, 10 Drawing Sheets

IGNITION SYSTEM FOR VEHICLE

This is a continuation, of application Ser. No. 842,683, filed Mar. 21, 1986, now abandoned.

BACKGROUND OF THE INVENTION

The invention relates to an ignition circuit for vehicle.

An ignition circuit used on a vehicle is generally constructed so that switch contacts of an ignition key cylinder is connected in a power supply line and is closed or opened by a key which is specifically related to the cylinder.

A conventional ignition circuit is schematically shown in FIG. 8. The ignition circuit shown is of a point contact type which may be used with a four cylinder engine. Referring to FIG. 8, the circuit generally comprises a storage battery 101 which is mounted on a vehicle, an ignition coil 102, a distributor 105 and a cylinder head 113 (which forms the engine). Components which are disposed within an engine room are enclosed within a block indicated in double dot phantom line 100 while components adjacent to a driver's seat are enclosed within a block indicated in double dot phantom line 200.

The battery 101 which is located within the engine room has its negative terminal connected to the body of the vehicle, which serves as a ground, while its positive terminal is connected through a supply line La to contact B of an ignition key cylinder 201 which is arranged in opposing relationship with a driver's seat. The ignition key cylinder 201 comprises a rotary switch including contact B and another contact IG, and the circuit connection therebetween may be closed or opened by inserting and turning a key 202 which is specifically related to the particular ignition key cylinder 201. It will be appreciated that the key 202 is inherently related to a particular vehicle and also serves as a door lock key. In the description to follow, a switch comprising contacts B and IG will be referred to as an ignition switch. The contact IG is connected to the primary coil 1 of the ignition coil, which is also within the engine room, through the supply line La. In this manner, the supply line La which provides a connection between the positive terminal of the battery 101 and the primary coil 1 extends to the driver's seat once where the ignition switch is connected therein.

The other end of the primary coil 1 is connected through a ground line Le to a breaker arm 107 of the distributor 105. The distributor 105 comprises a breaker plate 109 including a cam 106, the breaker arm 107 and a point arm 108, and a rotor head 112 including a rotor 110 and a plurality of segments 111*a*, 111*b*, 111*c* and 111*d*. As indicated by broken lines, the rotor 110 and the cam 106 are coupled together through a drive shaft, not shown. This drive shaft is coupled to the crankshaft of the engine and thus rotates together with the engine. Both the breaker arm 107 and the point arm 108 are provided with contact points, and the point arm 108 is connected through the ground line Le to the ground or the body of the vehicle. In this manner, the contact points are connected in the ground line Le which provides a connection between the primary coil 1 and the body of the vehicle which serves as the electrical ground.

When the ignition switch is turned on and the contact points are closed, a closed circuit is completed through a path starting from the positive terminal of the battery 101 and including the contact B and contact IG of the ignition key cylinder 201, primary coil 1, breaker arm 107, point arm 108, the body of the vehicle and returning to the negative terminal of the battery 101. As a consequence, the primary current flows through the closed circuit, whereby the primary coil 1 produces a magnetic flux. Under this condition, when the cam 106 rotates to push up the breaker arm 107 to open the contact points, the primary current is interrupted, rapidly reducing the magnetic flux developed by the primary coil. A secondary coil 2 is magnetically coupled to the primary coil 1, and accordingly, the rapid change in the magnetic flux induces a high voltage or spark voltage across the secondary coil 2. The high voltage induced across the secondary coil 2 is applied to the rotor 110 which then distributes the high voltage to individual segments 111*a*, 111*b*, 111*c* or 111*d* at predetermined times during the rotation thereof. The segments 111*a*, 111*b*, 111*c* and 111*d* are electrically connected to spark plugs 114*a*, 114*b*, 114*c* and 114*d*, respectively, of the cylinder head 113. Upon application of the high voltage to each of the spark plugs 114*a* to 114*d*, it produces a spark discharge which ignites a gas mixture within a cylinder chamber, not shown, in which the respective spark plug is disposed. Such function will hereafter be referred to as that "the engine is ignited". In FIG. 8, a capacitor C is connected across the contact points to prevent sparks from occurring as a result of a chattering of the breaker arm 107.

In the ignition circuit of the type described, the supply line La which provides a connection between the positive terminal of the battery 101 and the primary coil 1 of the ignition 102 extends from the engine room into the driver's seat once where the ignition switch is connected therein. Accordingly, it is a simple matter to pull out the terminals of the supply line La which are connected to the contacts B and IG from the rear side of the ignition key cylinder 201 or on the side opposite from the side in which the key is inserted. This means that a direct connection of the primary coil 1 to the positive terminal of the battery 101 is enabled by pulling out the supply line La to short-circuit the ignition switch without requiring the key 202. In other words, a conventional ignition circuit suffers from the inconvenience that the vehicle may be subject to a theft by third party who is different from the proper owner of the inherent vehicle key, by allowing the engine to be ignited through short-circuiting the ignition switch thereof.

SUMMARY OF THE INVENTION

It is an object of the invention to prevent such theft from occurring.

The object is achieved in accordance with the invention by providing an ignition system for vehicle including spark voltage generating means having a primary and a secondary coil, switching means for intermittently passing a current through the primary coil to produce a spark voltage, and means for applying the voltage induced across the secondary coil to a spark plug of an engine; the ignition system comprising second switching means connected in a supply line which provides an electrical connection between a storage battery mounted on the vehicle and the primary coil, a ground line which provides an electrical connection between the primary coil and the electrical ground, or a control line which controls the energization of the spark voltage generating switching means, for controlling the generation of a spark voltage; a switching driver for turning the second switching means on or off; switching control means for retaining a specific code and for comparing a code entered against the specific code to determine a coincidence/non-coincidence and for causing the switching driver to turn the second switching means on when the coincidence is determined; and means for entering a code to the switching control means.

With this arrangement, an ignition circuit may be formed without extending the supply line from the engine room into the driver's room once. In the absence of the specific code entered, the generation of a spark voltage across the secondary coil is prevented, thus effectively avoiding a theft of the vehicle which may take place as by short-circuiting the supply line around the ignition switch.

Other objects and features of the invention will become apparent from the following description with reference to the drawings.

DETAILED DESCRIPTION OF EMBODIMENTS

Figure 1A:
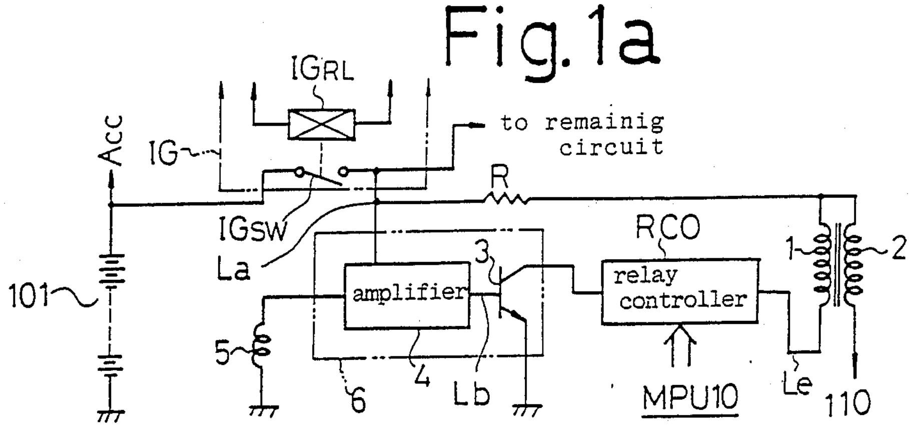
FIGS. 1*a*, 1*b* and 1*c* are circuit diagrams of ignition circuits for vehicle constructed according to several embodiments of the invention.

Referring to FIG. 1*a*, there is shown a schematic circuit diagram of an ignition circuit according to one embodiment of the invention. The embodiment shown is constructed as a fully transistorized ignition circuit. A fully transistorized ignition circuit does not have contact points, and a current flow through the primary coil 1 is controlled by a power transistor 3. An energization control voltage is applied to the base of the transistor 3 from an amplifier 4 through an energization control line Lb. The control voltage normally assumes an on potential, but is changed to a cut-off potential at an ignition timing, thus driving the transistor 3 into its cut-off condition to interrupt the primary current. As a consequence, a high voltage or spark voltage is induced across the secondary coil 2 in response thereto, and is distributed to the individual spark plugs through the rotor 110 as mentioned above. The amplifier 4 detects the ignition timing by means of a pickup coil 5. Specifically, a reluctor, not shown, of a magnetic material and having a number of projections which corresponds to the number of cylinders is mounted on the drive shaft of the distributor, and as one of the projections on the reluctor moves close to the pickup coil 5 during the rotation of the distributor, there occurs a change in magnetic flux linkage, causing a change in the inductive current through the coil 5. In this manner, the amplifier 4 is capable of detecting the ignition timing. The amplifier 4 and the power transistor 3 are packaged into one unit which is commonly referred to as an igniter 6. In FIG. 1*a*, a resistor R is connected in the circuit of the primary coil in order to improve the rising response.

FIG. 1*a*, phantom line IG which is shown as connected in the supply line La represents an ignition switch unit which corresponds to the ignition switch mentioned initially. When an ignition relay $IG_{RL}$ is energized or deenergized in response to an operation of an IG key to be described later, relay contacts $IG_{SW}$ make or break, thus connecting or interrupting the circuit of the supply line La.

In the embodiment shown in FIG. 1*a*, the ground line Le which provides a connection between the primary coil 1 and the body of the vehicle or the electrical ground, or more exactly, a line providing a connection between the primary coil 1 and the igniter 6 has a relay controller RCO connected therein. The relay controller RCO is responsive to an instruction from a microcomputer (hereafter referred to as MPU) 10 to connect or disconnect the ground line.

Figure 2:
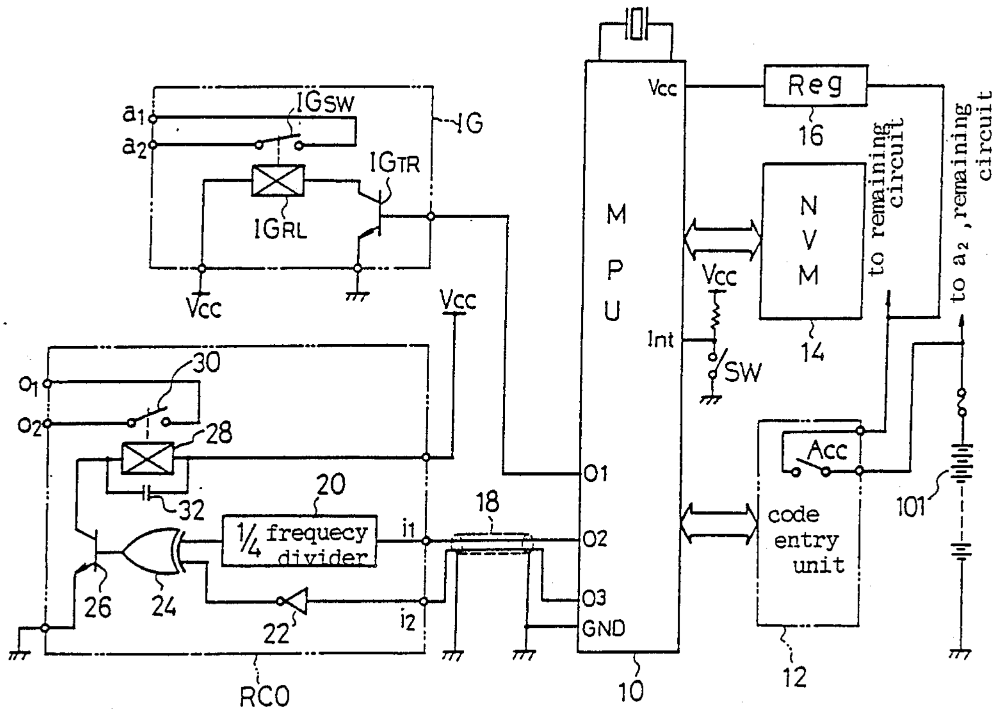
FIG. 2 is a block diagram of a relay controller and its associated control system shown in FIGS. 1*a* to 1*c*.

FIG. 2 generally shows the arrangement of a control circuit which essentially comprises the relay controller RCO and MPU 10. MPU 10 includes input/output ports, to which are connected a code entry unit 12, non-volatile memory (hereafter abbreviated as NVM) 14, the ignition switch unit IG and the relay controller RCO. The code entry unit 12 includes a switch Acc, standing for an accessory mode switch which enables an automobile audio system to be used, which when closed, allows a constant voltage Vcc to be supplied to MPU 10 from the battery 101 on the vehicle through a constant voltage circuit (hereafter abbreviated as Reg) 16.

As is well known, NVM 14 enables a free read/write operation and is capable of retaining the stored content if the power supply is turned off. In the present embodiment, it stores a specific code, which will be hereafter referred to as a registered code. MPU 10 has an interrupt input port Int, which is connected to a code changing switch SW which can be used to update the registered code stored in NUM 14. The code changing switch SW is housed within a lockable glove box and normally remains off.

The ignition switch unit IG comprises a relay drive $IG_{TR}$, an ignition relay $IG_{RL}$ and relay contacts $IG_{SW}$ which are connected in the supply line La. When an input port 01 of MPU 10 assumes an H level, the relay driver $IG_{TR}$ is turned on to energize the ignition relay $IG_{RL}$, thus making or closing the relay contacts $IG_{SW}$.

The relay controller RCO comprises a divide-by-four frequency divider 20, an inverter 22, exclusive OR gate 24, a relay driver 26 and an ignition lock relay 28. The relay controller RCO has an input terminal $i_1$ to which an Enable 1 signal is applied and the other input terminal $i_2$ to which an Enable 2 is applied. When these Enable signals are applied, the relay 28 is energized, whereby its relay contacts 30 close. In this embodiment, the relay contacts 30 are connected in the ground line Le, and hence its terminal $o_1$ is connected to the ground side of the primary coil 1 while its terminal $o_2$ is connected to the igniter 6.

Figure 3:
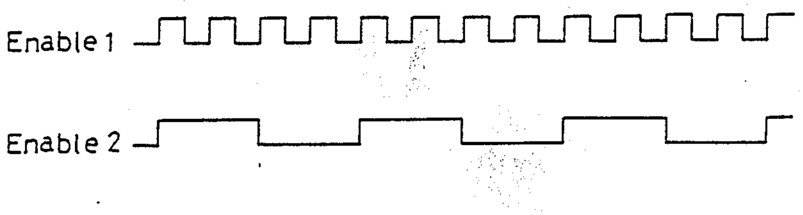
FIG. 3 graphically shows timing charts of selected enable signals.

The Enable 1 and Enable 2 signals are delivered from output ports 02 and 03 of MPU 10 through a shielded cable. Enable 1 and Enable 2 signals are graphically shown in FIG. 3. As shown, Enable 2 signal has a period which is as long as four times that of Enable 1 signal. The frequency divider 20 is triggered by the rising edge of the Enable 1 signal and delivers a pulse which is similar to the Enable 2 signal. This signal feeds one input of the exclusive OR gate 24, the other input of which receives the Enable 2 signal as inverted by the inverter 22. In response to these inputs, the gate 24 produces an output of H level. When the gate 24 delivers an output of H level, the relay driver 26 is turned on, allowing the ignition lock relay 28 to be energized, whereupon the relay contacts 30 close, providing an electrical connection of the ground line Le between the primary coil 1 and the igniter 6. The relay 28 is shunted by a capacitor 32, thus providing a delayed relay which is effective to prevent a misfire which may be caused by noises which temporarily turn the relay driver 26 off to cause the relay contacts 30 to break.

It will be seen that the ignition lock relay 28 cannot be energized if a signal line is pulled out and connected to a terminal having an H level such as Vcc, for example, or to a terminal having an L level such as the body of the vehicle, for example, inasmuch as the input signal to the relay controller RCO is not a simple H level or L level signal.

Figure 1B:
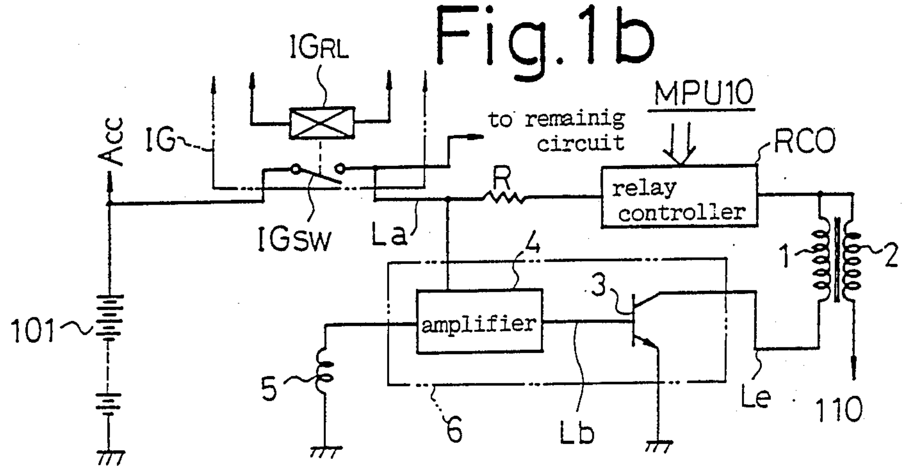

FIG. 1*b* shows another embodiment in which the relay controller RCO is connected in the supply line La which provides the connection between the storage battery 101 and the primary coil 1. In this instance, the terminal $o_1$ of the relay controller RCO is connected to the side of the supply line La which is connected to the battery 101 while the terminal $o_2$ is connected to the side of the supply line La which is connected to the primary coil 1. Thus, the relay contacts 30 are connected in the supply line La which provides a connection between the battery 101 and the primary coil 1.

Figure 1C:
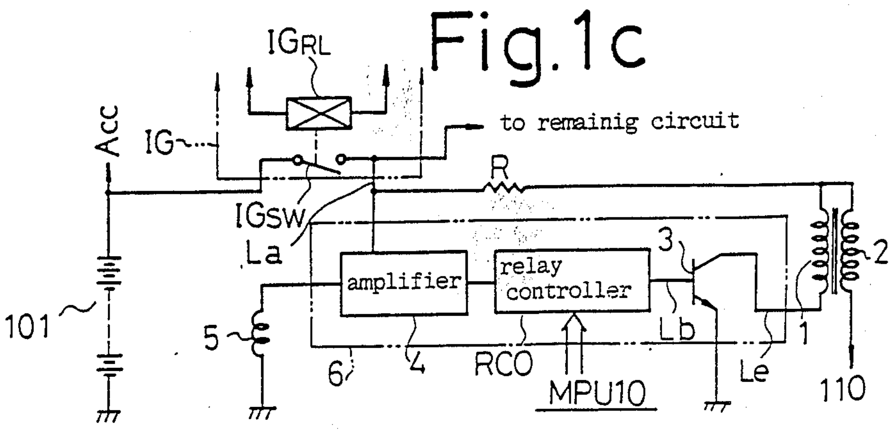

FIG. 1*c* shows a further embodiment in which the relay controller RCO is connected in the energization control line Lb which is included within the igniter 6. In this instance, the relay controller RCO has its terminal $o_1$ connected to the side of the energization control line Lb which is connected to the amplifier 4 and its terminal $o_2$ connected to the side of the energization control line Lb which is connected to the power transistor 3. Thus, the relay contacts 30 are connected in the energization control line Lb which provides a connection between the output of the amplifier 4 and the base of the transistor 3.

Generally, MPU 10 is adapted to receive a selected code from the code entry unit 12, and to deliver the Enable 1 and the Enable 2 signal to cause the relay controller RCO to generate a spark voltage when the code entered coincides with the registered code in NVM 14. In response thereto, a connection of the ground line Le is completed in the embodiment shown in FIG. 1*a*, a connection of the supply line La is completed in the embodiment shown in FIG. 1*b*, and a connection of the energization control line Lb is completed in the embodiment shown in FIG. 1*c*, enabling a spark voltage to be generated as the engine rotates in each instance. This will be hereafter referred to as that "the ignition circuit is completed".

Figure 4:
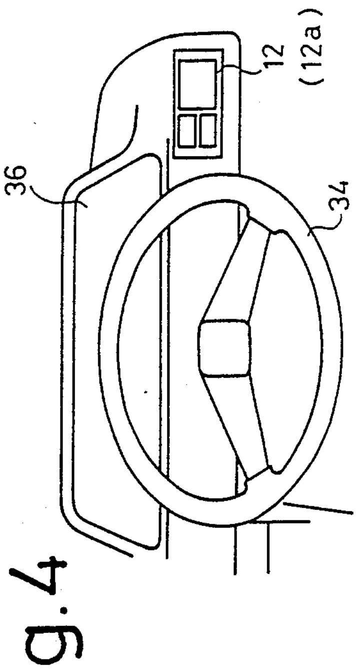
FIG. 4 is a front view of an instrument panel of a vehicle, illustrating part of the appearance thereof.

The code entry unit 12 will now be described. FIG. 4 shows part of the appearance of an instrument panel of a vehicle. Specifically, a steering wheel is shown at 34 and an instrument cluster is shown at 36. The code entry unit 12 is disposed to the right and below the instrument cluster 36.

Figure 5A:
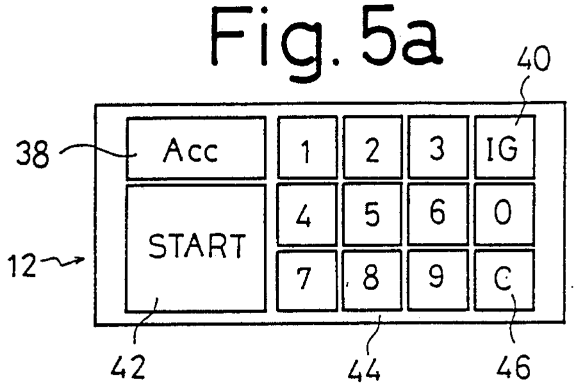
FIG. 5*a* is a front view of a code entry unit including numerical keys.

FIG. 5*a* shows one form of code entry unit 12. As shown, it includes Acc switch 38, an IG key 40, a start switch 42, numerical keys 44 and a clear key 46. The Acc switch 38 is constructed as an alternate switch, and is turned on and off repeatedly for each depression of the switch. The start switch 42 is a spring back switch which is illuminated from the rear side, and is illuminated when establishing the IG mode, allowing the starter, not shown, to be energized as long as it is depressed.

Figure 9A:
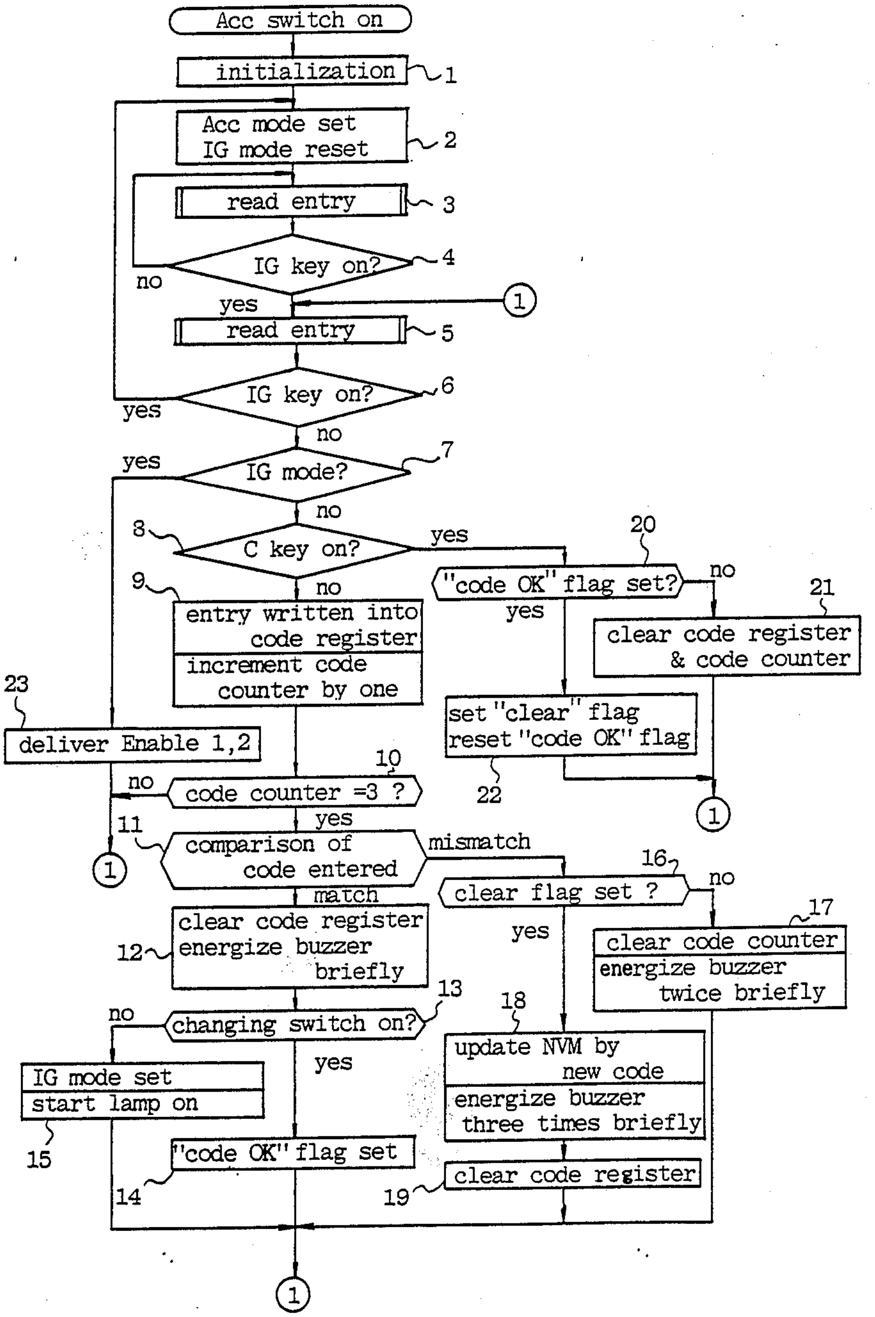
FIG. 9*a* is a flowchart illustrating the operation of a microcomputer shown in FIG. 2 in response to a code entry using numerical keys.

The operation of MPU 10 in response to a code entry using the code entry unit shown in FIG. 5*a* will now be described with reference to the flowchart shown in FIG. 9*a*. In the description to follow, the number of a particular step in the program will be designated by "S--", and in the flowcharts of FIGS. 9*a* and other Figures, numerals attached to the leaders extending from blocks, representing individual steps, represent the number of such steps.

Initially when the Acc switch 38 is closed, a constant voltage Vcc is applied from the constant voltage circuit 16, initializing the internal RAM, registers and output ports at S1. Subsequently, the Acc mode (accessory mode) is established at S2, and the operation of IG key 40 is monitored by a loop comprising S3 and S4.

When the IG key 40 is operated, the program exits from the loop at S4, and reads the input at S5. If numerical keys 44 are operated at this time, the value entered is written into a code register at S9. The registered code comprises three digits, and hence the entry item is read until a code counter reaches 2. When the clear key 46 is operated during the entry of a code when two digits or less have been entered, the program proceeds from S8 to S20 and S21 where the code register and the code counter are cleared. This represents a processing operation which is used when correcting a code entered by a driver.

When the entry of a three digit code is completed, the code entered is compared against the registered code stored in NVM 14 at S11. When they match, the code register, the code counter, a "code OK" flag and a "clear" flag are cleared at S12, and a buzzer, not shown, is energized once for a short time interval, indicating the reception of the entry code to the driver. Subsequently, unless the changing switch SW is on, the IG mode is established at S15, and a start lamp is illuminated by turning the start switch 42 on.

When the entry code does not match the registered code, the program proceeds to S11, S16 and S17, and the buzzer is energized twice for a short time interval, indicating an error in the entry to the driver. The code register and the code counter are cleared at S19.

When the IG mode is established, a loop is defined by S5, S6, S7 and S23, which delivers the Enable 1 and the Enable 2 signal and provides an instruction to energize the ignition relay $IG_{RL}$, thus completing the ignition circuit. When the IG key is operated again during the IG mode, the program exits from this loop at S6, and the IG mode is terminated at S2, thus returning to the Acc mode while turning the start lamp off.

When the changing switch SW is on, if the entry code matches the registered code, the program proceeds from S13 to S14, and sets "code OK" flag. In this instance, since the IG mode is not established, a loop is defined by S5, S6, S7, S8, S9 and S10. When the clear key 46 is operated in this loop, the program exits from the loop at S8 and then proceeds to S20. Since the "code OK" flag has been set, the program then proceeds to S22 where the "clear" flag is set while resetting the "code OK" flag.

Subsequently when a three digit code or new code to be updated is entered in the loop defined by S5 to S10, the program proceeds from S11 to S16 since the previous code or old code is still registered in NVM 14. However, because the "clear" flag has been set, the stored content of NVM 14 is updated by the content of the code register or the new code which is now entered at S18, and the buzzer is energized three times for a short time interval, indicating the completion of updating the registered code to the driver. The code register and the code counter are cleared and the "clear" flag is reset at S20.

Summarizing the operation on the part of the driver, he initially turns the Acc switch 38 on and then operates the IG key 40. A three digit code which corresponds to the code to be registered is entered using the numerical keys 44. When a correction is required, the C key 46 is operated, and the entry of the code is repeated from the beginning. Because the buzzer sounds twice when a wrong entry is made, the entry of the code is repeated from the beginning. After the entry code has been accepted, as indicated by the buzzer sounding once and the start key 42 being illuminated, he operates the start key 42 to start the engine. When stopping the engine, he operates the IG key 40 again. When the registered code is to be changed, the changing switch SW is initially turned on and then a three digit code corresponding to the registered code or old code is entered. After the entered code has been accepted, as indicated by the buzzer sounding once, the C key 46 is operated and then the numerical keys 44 are operated to enter a new three digit code, thus updating the registered code, which is indicated by the buzzer sounding three times. A correction of the new code being entered can take place in the same manner as mentioned previously. If the updating of the registered code is to be interrupted, the changing switch is turned off before the old code or the code which is now being registered may be entered. Subsequent to the registration of the new code, the described operation is performed on the basis of the new code. When parking the vehicle, the Acc switch 38 is operated again to cease the operation of MPU 10.

An embodiment in which the code entry unit 12 shown in FIG. 2 comprises a key code emitter which emits a signal containing code information, and a key code receiver which receives the signal emitted by the key code emitter and detects the code information contained therein will now be described. In this instance, the key code receiver is mounted on the vehicle while the driver carries the key code emitter.

Referring to FIG. *6a*, the key code emitter of this embodiment is schematically shown. The emitter includes a 16 bit parallel-in serial-out shift register SR having 16 parallel input terminals, a clock pulse input terminal CLK, a shift/load input terminal SL, a clock inhibit input terminal CI and a serial output terminal OUT. Each of the parallel input terminals is connected to a pull-up resistor and a switch DSW of dual-in-line package type (DIP). The other end of the switch DSW is connected to the ground. The switches DSW are used to define a code in binary notation which is stored in NVM 14. The inputs SL and CI of the shift register SR are supplied with signals from a timing circuit TM.

An oscillator OSC1 develops a signal which is applied to the input of the timing circuit, to the clock input of a D-type flipflop FF1 and to the clock input of the shift register SR. The output terminal OUT of the shift register SR is connected to the D input of the flipflop FF1, the output terminal Q of which is connected to an FM modulator MOD. The output of the modulator MOD feeds a high frequency amplifier RF1, the output of which is connected through a tuning circuit to a transmission antenna AT1. The amplifier RF1 has a radio wave transmit/stop control input, which is provided in order to reduce the power dissipation by the key code emitter. As shown, this input is connected to the output of the timing circuit TM.

FIG. *6b* shows a series of timing charts which illustrates the operations of the key code emitter. The operation of the key code emitter will now be described with reference to FIGS. *6a* and *6b*. When a power switch Tsw is turned on, the constant voltage Vcc is fed from a battery Ba through a constant voltage circuit REG. When the clock inhibit input CI of the shift register SR assumes a low level (L), the transmission of a radio wave is initiated and a data shift operation within SR is initiated. At this time, a high level (H) signal is applied to the shift/load input SL, and hence key code data which is applied to the parallel inputs are not read, and the shift register SR delivers data "1" at its output terminal OUT. This continues over five clock periods. In other words, a start bit data "11111" is output from the shift register. When the five clock periods are over, an L level is applied to the shift/load input SL for a short time interval, whereby given key code data which has been established at the parallel inputs is preset into the individual bits of the shift register SR.

Subsequently, 16 bit key code data is output serially in synchronism with the clock. When the key code data has been delivered completely, the shift register again delivers the start bit data and then begins to deliver the key code data for the second time. After repeating such operation several times, an H level is applied to the clock input CI, thus stopping the transmission of a radio wave for a period Ts. The described operation is repeated at a given time period until the power switch Tsw is turned off.

The flipflop FF1 passes data from the shift register SR to its output terminal in response to the rising edge of the clock pulse. The output signal from the flipflop FF1 is used to effect a frequency modulation within the modulator MOD, and the modulated signal is amplified by the amplifier RF1 and is then radiated from the antenna AT1 as a radio wave.

FIG. *6c* schematically shows the key code receiver which is mounted on the vehicle. In this embodiment, the key code receiver comprises an oscillator OSC2, a local oscillator OSC3, a high frequency amplifier RF2, a mixer MIX, an intermediate frequency amplifier IFA, a frequency discriminator DIS, an audio frequency amplifier AFA, and a comparator CP1. A receiving antenna AT2 is connected to the input of the high frequency amplifier RF2 through a tuning circuit. A radio wave radiated from the key code emitter is amplified by the amplifier RF1 upon reception, and is then mixed with the oscillation frequency from the local oscillator OSC3 in the mixer MIX to be converted into the intermediate frequency. Subsequently, the signal is amplified by the amplifier IFA and is demodulated by the frequency discriminator DIS. The demodulated signal is amplified by the audio amplifier AFA and converted and waveform shaped into a binary signal depending on the signal level by means of the comparator CP1. The oscillator OSC2 delivers clock pulses of the same frequency as that of the oscillator OSC1 in the key code emitter, in synchronism with the detected output.

Figure 5B:
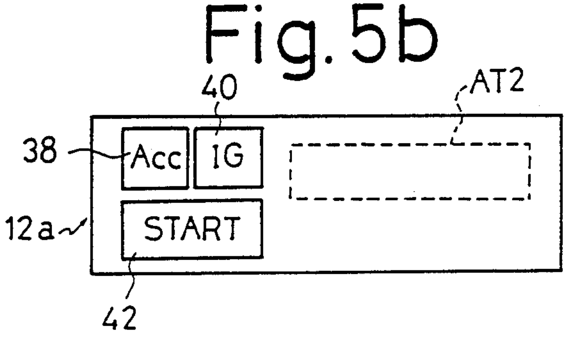
FIG. 5*b* is a front view of a vehicle mounted code entry unit including a key code receiver.

The key code receiver is assembled into the code entry panel 12a at the location shown in FIG. 4. The appearance of the code entry panel 12a is illustrated in FIG. 5b. The panel 12a comprises an insulating plate such as may be formed of acrylic material, carrying the Acc switch 38, the IG key 40 and the start switch 42 on its surface. These switches and key function in the similar manner as mentioned previously. The receiving antenna AT2 comprises a ferrite bar antenna which is disposed on the rear surface of the panel for receiving a radio wave through the panel 12a.

Figure 6C:
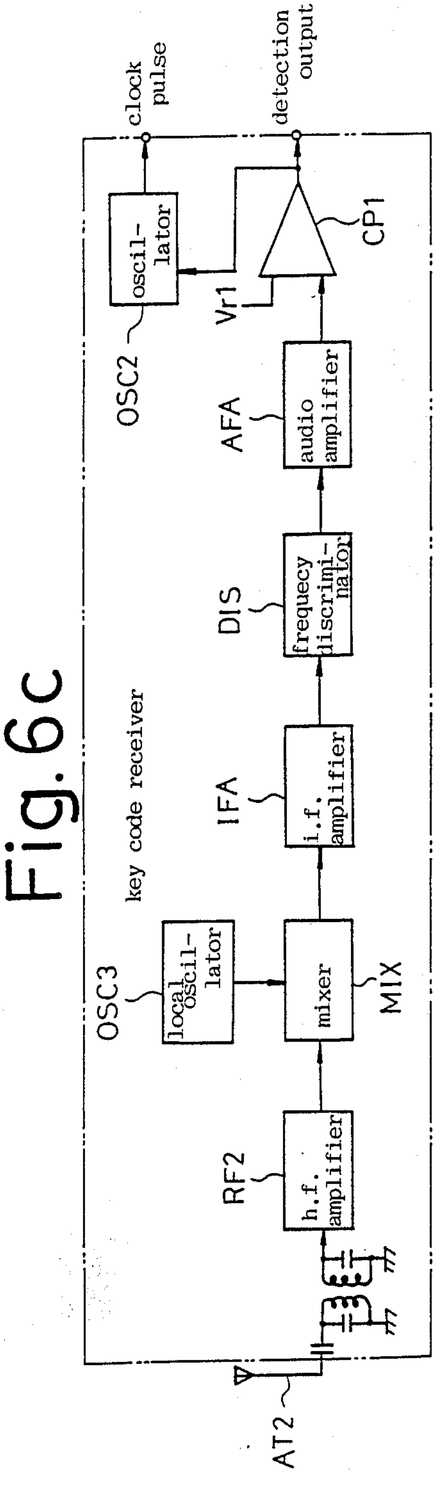
FIG. 6*c* is a schematic block diagram of a key code receiver which cooperates with the key code emitter shown in FIG. 6*a*.
Figure 6A:
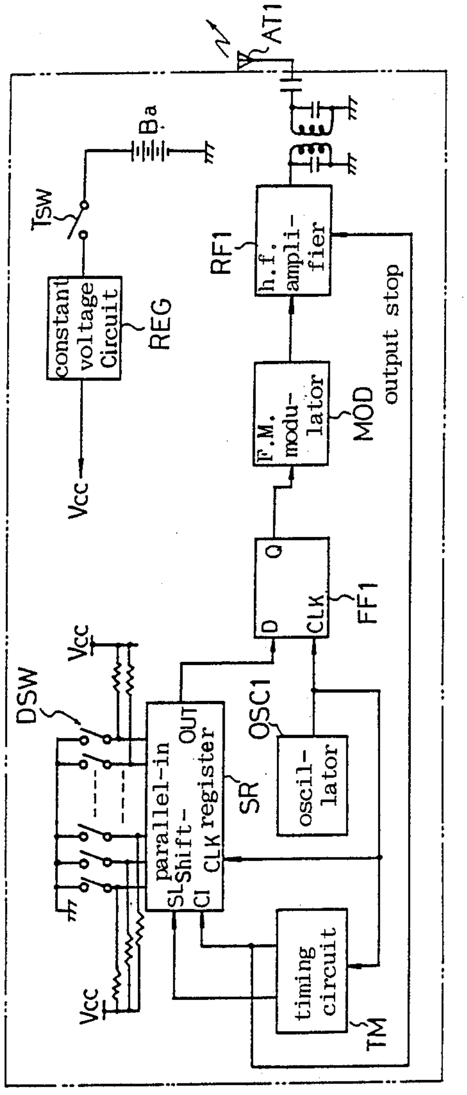
FIG. 6*a* is a schematic block diagram of a key code emitter.
Figure 6B:
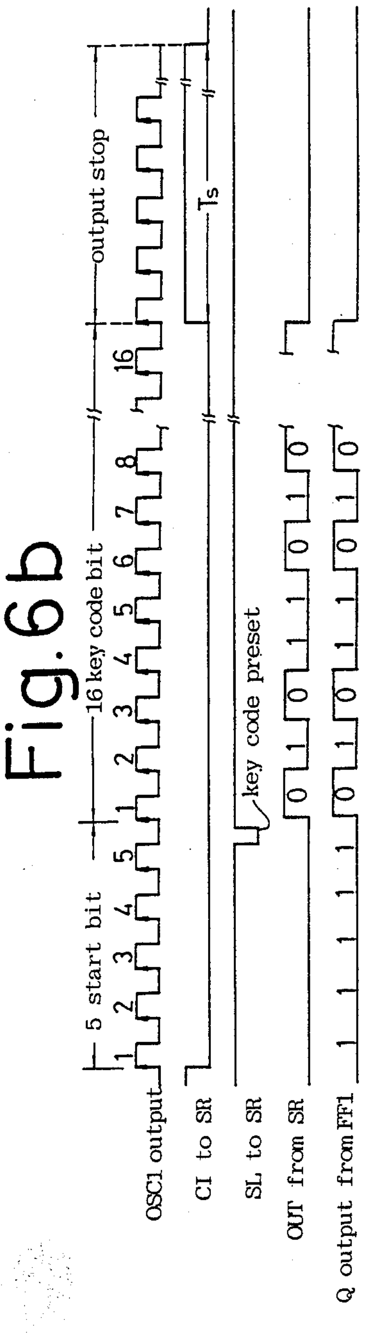
FIG. 6*b* graphically shows timing charts which illustrate the operation of the key code emitter shown in FIG. 6*a*.
Figure 9B:
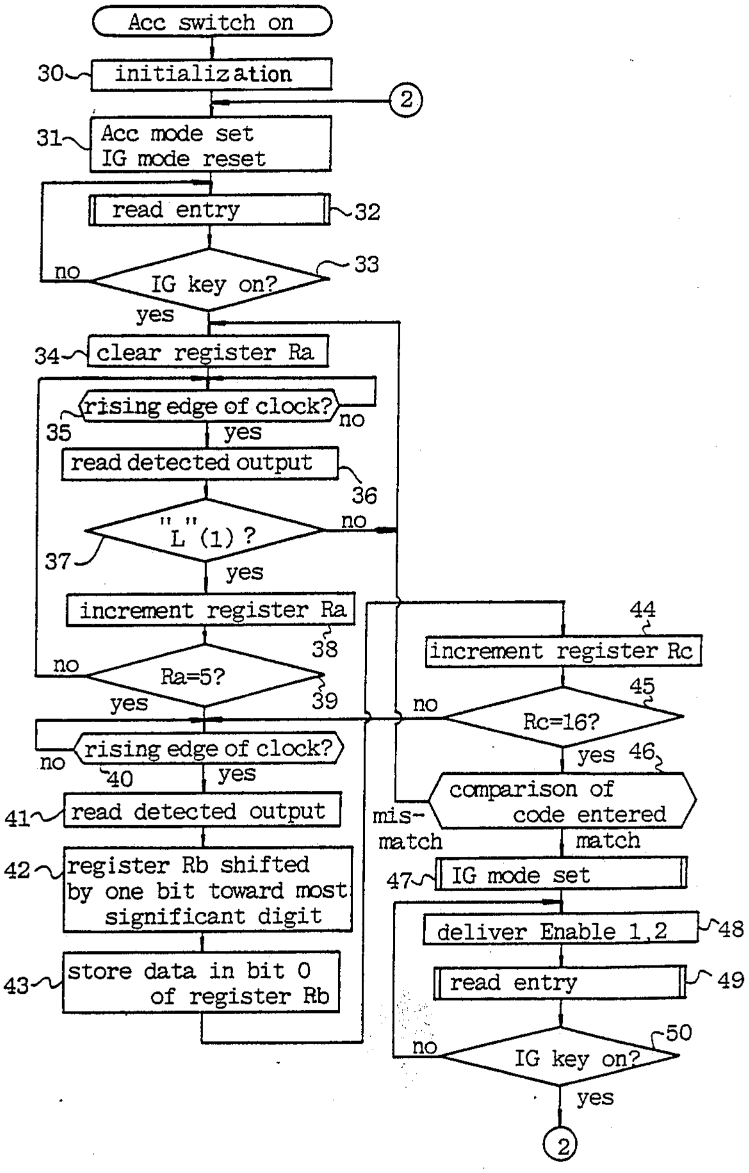
FIG. 9*b* is a flowchart illustrating the operation of the microcomputer shown in FIG. 2 in response to the reception of a radio wave containing key code information.

Referring to FIG. 9b which shows a flowchart, the operation of MPU 10 when providing a code entry with the code entry unit 12 which comprises the key code emitter shown in FIG. 6a and the key code receiver shown in FIG. 6c will now be described.

The driver initially closes the Acc switch to establish the Acc mode (accessory mode). After depressing the IG key 40, the power switch Tsw of the key code emitter is closed to emit the registered code data, thus establishing the IG mode. The power switch Tsw of the key code emitter comprises a spring back switch, and hence ceases to emit the transmission of the data upon release. The ignition circuit is completed in the IG mode, and hence when the start switch 42 is turned on, the starter is energized to set the engine in operation. In the IG mode, another operation of the IG key 40 causes the operation to return to the Acc mode and the engine ceases to operate.

When the Acc switch 38 is turned on, the constant voltage Vcc is supplied from the constant voltage circuit 16. After initializing the internal RAM, registers and output ports at S30, the Acc mode is established and the IG mode is reset at S31, and the operation of the IG key 40 is monitored by a loop defined by S32 and S33.

When the IG key 40 is operated, the program begins to read the received input or the detected output. The key code data which is delivered from the key code emitter includes five start bits, which are initially detected by steps S34 to S39. This is accomplished by reading the level of the detected output signal in synchronism with the rising edge of the clock pulse produced by the oscillator OSC2, and incrementing a register Ra when L level is detected. If an H level is found before five consecutive L levels are detected, the register Ra is cleared at S34, and the detection of the start bits is repeated from the beginning again.

When the start bits are detected, the detection of a key code comprising 16 bits is executed by steps S40 to S45. Again, the level of the detected output is read in synchronism with the rising edge of the clock pulse. During such process, the content of a 16 bit register Rb is sequentially shifted by one bit toward the most significant digit, and the content of the data bit read (1/0) is stored in the least significant digit. This operation is repeated until 16 bits of the key code are entirely read. A register Rc counts 16 bits.

When the key code which is read does not match the registered code stored in NVM 14, the program loops back from S46 to S34 to begin the detection of the start bits since the key code emitter repeatedly emits the code data as long the power switch is maintained on.

When the key code which is read matches the registered code stored in NVM 14, the ignition relay $IC_{RL}$ is energized, and the start switch 42 is turned on to establish the IG mode.

In the IG mode, a loop defined by steps S48, S49 and S50 is effective to deliver the Enable 1 and the Enable 2 signal. An operation of the IG key 40 during the IG mode causes the program to return to step S31, thus returning to the Acc mode.

Finally a further embodiment in which the code entry unit 12 of FIG. 2 is formed by a combination of a key card containing code information and a key card reader which reads the code information stored in the key card when the latter is inserted will now be described. The key card reader is mounted on the vehicle while the drive carries the key card.

Figure 5C:
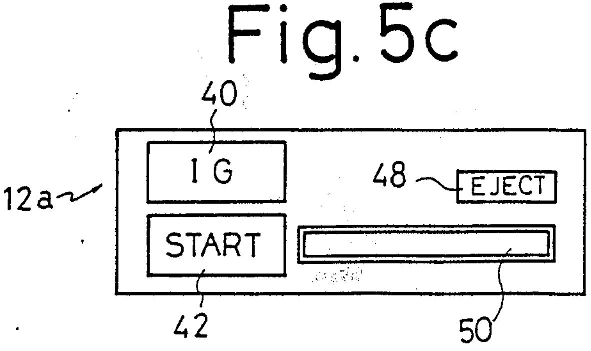
FIG. 5*c* is a front view of a vehicle mounted code entry unit including a key card reader.
Figure 7A:
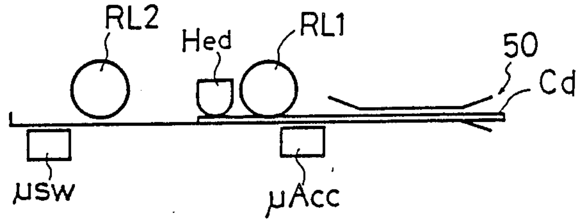
FIG. 7*a* is a cross section of a key card reader which is provided within the code entry unit of FIG. 5*c*.
Figure 7B:
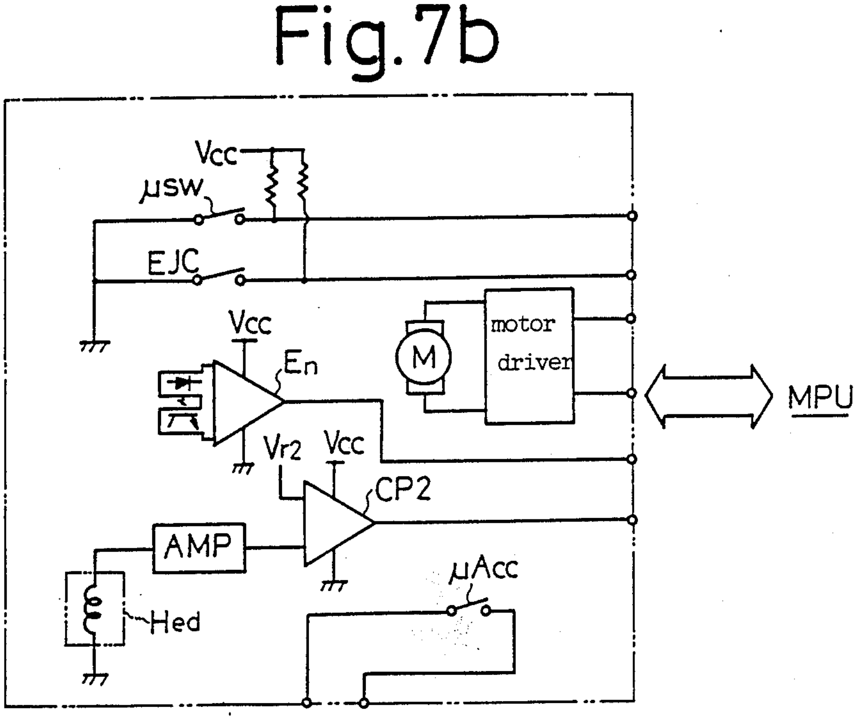
FIG. 7*b* is a schematic block diagram of the key card reader.
Figure 8:
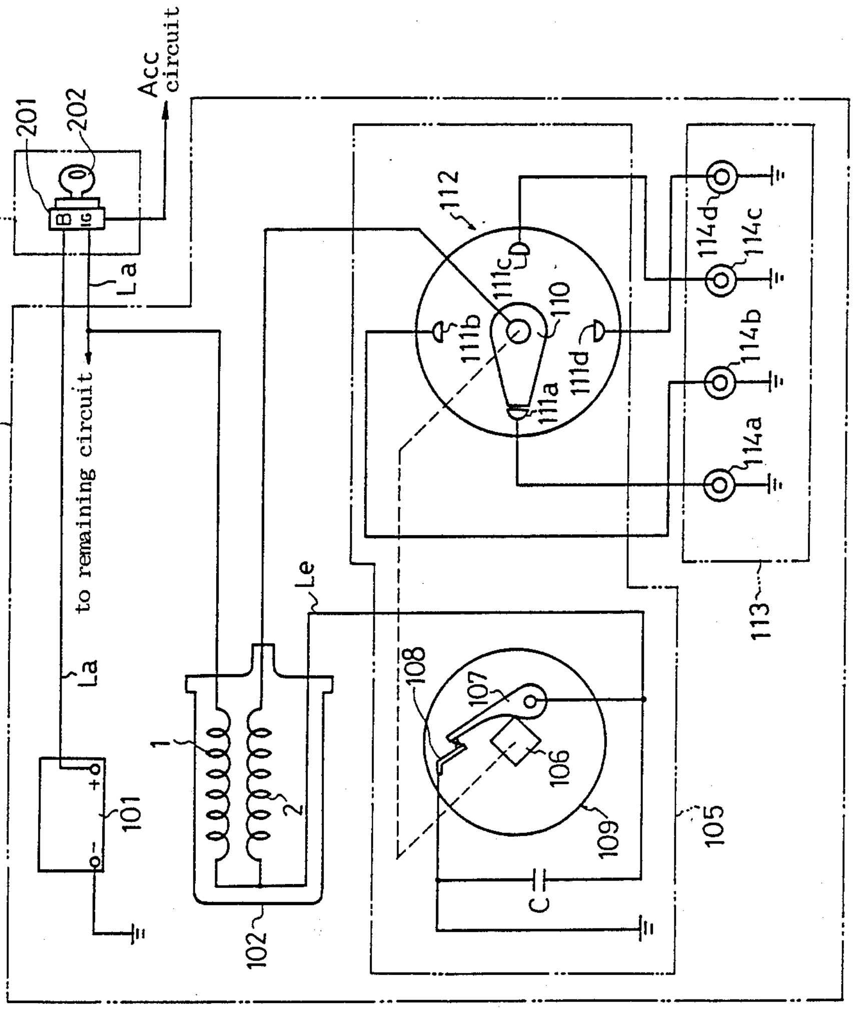
PRIOR ART Fig.8
FIG. 8 is a block diagram of a conventional ignition circuit.

FIG. 5c shows the appearance of a code entry panel which is provided with the key card reader. The IG key 40 and the start switch 42 function in the similar manner as mentioned previously. The panel is formed with an opening 50 into which the key card is to be inserted. The panel also incudes an eject key (EJC key) which instructs the removal of the key card. The key card reader with the key card inserted therein is schematically shown in cross section in FIG. 7a while the electrical circuit of the key card reader is shown in FIG. 7b, which will be described below.

The key card reader comprises a magnetic reader which reads an entered code on a magnetic tape which is applied to the key card at a given location. The reader includes a pair of key card conveying rollers RL1 and RL2, a magnetic head Hed for reading the code and a pair of microswitches μAcc and μSw. The rollers RL1 and RL2 are driven for rotation by a motor M to convey the key card. The rotation of the motor M is detected by a rotary encoder En, which provides timing pulses.

When the key card Cd is inserted and the microswitch μAcc is turned on, the motor M is energized for rotation in the forward direction, whereby the rotation of the roller RL1 is effective to drive the key card inward. As the key card Cd is conveyed at a given rate of movement, the head Hed is capable of reading information which is written onto the magnetic tape on the key card Cd, in the form of voltage changes which are responsive to changes in the magnetic flux. The voltage change is amplified by an amplifier AMP and is then converted or waveform shaped into a binary signal depending on the signal level by means of a comparator CP2. As the key card Cd is further conveyed to cause the microswitch μSw to be turned on, the motor M is deenergized.

Figure 9C:
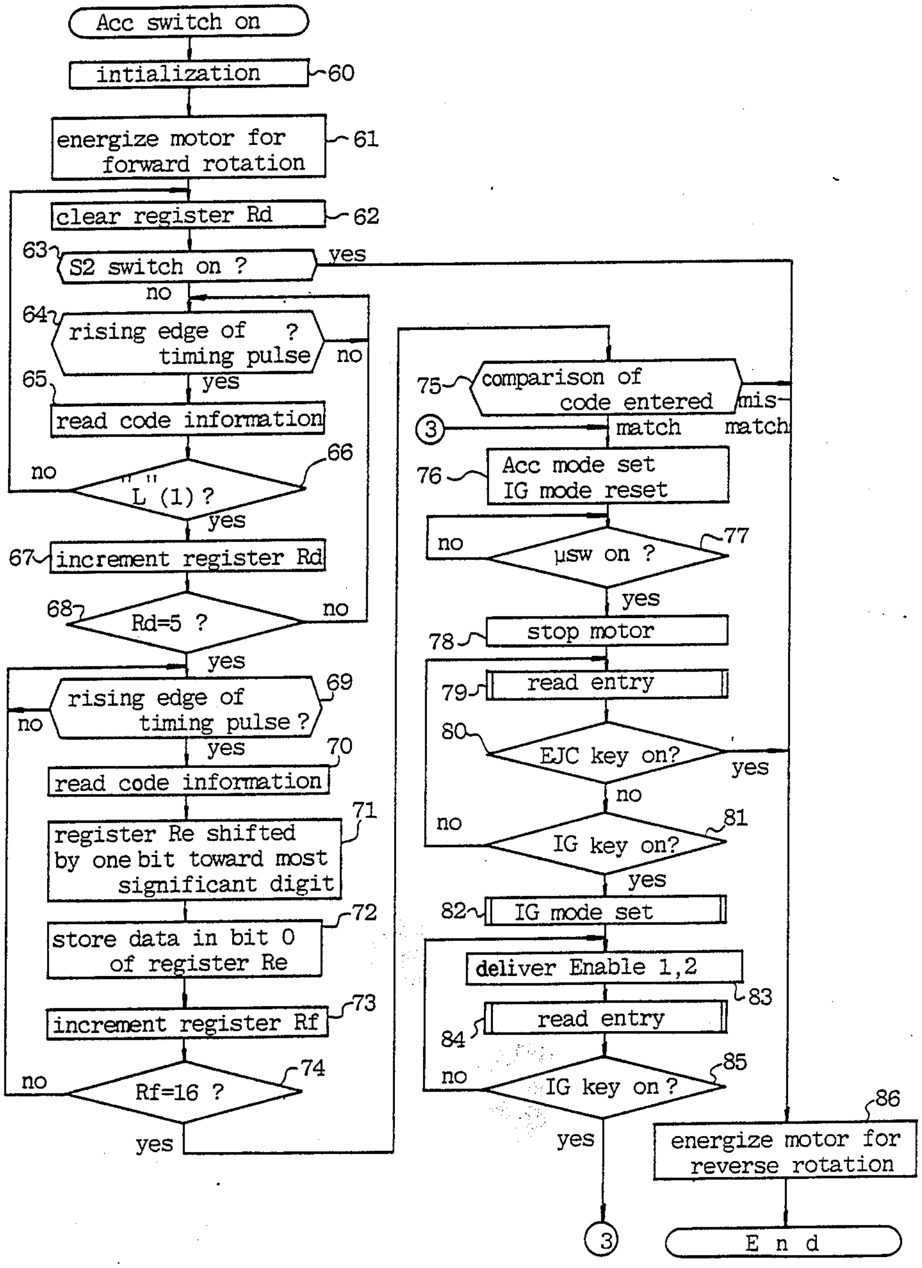
FIG. 9*c* is a flowchart illustrating the operation of the microcomputer shown in FIG. 2 in response to a code entry using a key card.

Referring to FIG. 9*c* which shows a flowchart, the operation of MPU 10 when using the code entry unit 12 defined by the combination of the key card Cd and the key card reader shown in FIG. 7*b* will be described. It is to be understood that the magnetic tape on the key card Cd stores five start bits and 16 bits which define a key code in the similar manner as those used in the key code emitter.

Initially describing the general operation, the driver inserts the key card into the opening 50. When it is received within the key card reader, the Acc mode is established. Subsequent depression of the IG key 40 establishes the IG mode. When the key card is not accepted, it is ejected from the opening 50. The ignition circuit is completed in the IG mode, and hence when the start switch 42 is turned on, the starter is energized to set the engine in operation. In the IG mode, another operation of the IG key returns the operation to the Acc mode in which the operation of the engine is interrupted. When the eject (EJC) key 48 is operated during the Acc mode, the card is ejected from the opening 50. The removal of the key card causes the microswitch μAcc to be turned off, whereby the Acc mode is terminated.

Specifically, when the key card is inserted, the Acc switch or the microswitch μAcc is turned on, whereby the constant voltage Vcc is supplied from the constant voltage circuit 16. Internal RAM, registers and output ports are initialized at S60, and the motor M is energized for rotation in the forward direction to drive the key card inward at S61.

At steps S62 to S68, a reading of the key code data which is written into the card is initiated concurrently as the card Cd is being conveyed. During the reading operation, the five start bits (L level) are initially detected. This is accomplished by reading the level of the output signal which is read (output of CP2) in synchronism with the rising edge of the timing pulse developed by the rotary encoder En, and incrementing a register Rd when the L level is found. If an H level is detected during the time the start bits are being detected, the register Rd is cleared, and the detection of the start bits is repeated again from the beginning. If the microswitch μSw becomes on before five consecutive bits having L level are detected, this means that the key card inserted is not a normal card, and hence the motor M is driven for rotation in the reverse direction to eject the key card at S86.

When the detection of the start bits has been completed, the detection of a 16 bit key code is executed by steps S69 to S74. Again, the key code on the card Cd is read in synchronism with the rising edge of the timing pulse in the same manner as mentioned previously. During such process, the content of 16 bit register Re is sequentially shifted by one bit toward the most significant digit, and the content of the data bit which is read (1/0) is stored in the least significant digit. The number of bits is counted by a register Rf, and the described operation is repeated until the entire 16 bits of the key code are read.

The key code which is read is compared against the registered code which is stored in NVM 14 at S75, and if they do not match, the program proceeds to S86 where the motor M is driven for rotation in the reverse direction to eject the key card.

When the key card which is read matches the registered code stored in NVM 14, step S76 establishes the Acc mode and resets the IG mode.

The key card is driven inward until the microswitch μSw is turned on, whereupon the program proceeds to S78 where the operation of the motor is stopped.

Steps S79, S80 and S81 form a loop which reads the input. If the EJC key is operated in this loop, the program proceeds to S86 where the motor M is energized for rotation in the reverse direction ot eject the key card. Alternatively, if the IG key 40 is operated, the program proceeds to S82 where the ignition relay $IG_{RL}$ is energized and the start switch 42 is turned on to establish the IG mode.

Subsequently, a loop defined by steps S83, S84 and S85 deliver the Enable 1 and the Enable 2 signal to complete the ignition circuit. If the IG key 40 is operated in this loop, the program proceeds to S76 where the IG mode is reset, thus returning to the Acc mode.

It will be appreciated from the foregoing description that the MPU 10 cannot deliver the Enable 1 and the Enable 2 signal in the absence of a code entry which is equivalent to the registered code from either the numerical keys, the key code emitter or the key card. Hence, the ignition circuit remains open. Specifically, either the supply line La, the ground line Le or the energization control line Lb remains interrupted, preventing a spark voltage from being developed across the secondary coil to start the engine. Since the Enable 1 and the Enable 2 signal are simple on/off signals, the ignition circuit cannot be completed as by short-circuiting, opening or connecting to the ground of the signal line. In this manner, a theft of the vehicle by short-circuiting the supply line around the ignition switch which has been a problem with a conventional construction of ignition circuit can be positively prevented.

In the embodiments described above, the supply line La in the ignition circuit has the relay switch $IG_{SW}$ (the relay contacts of the ignition relay $IG_{RL}$) connected therein, but such switch may be omitted or replaced by a conventional ignition switch, namely, the switch contacts of an ignition key cylinder with similar effect.

What is claimed is:

1. An ignition system for a vehicle comprising:

spark voltage generating means including a primary and a secondary coil;

first switching means for intermittently passing a current through the primary coil in order to generate a spark voltage;

means for applying a voltage induced across the secondary coil to the spark plugs of an engine;

second switching means connected to control a current in said primary coil of said spark voltage generating means for controlling the generation of a spark voltage;

switching driver means for receiving simultaneously, a first enabling signal and a second enabling signal, said switching driver means having enabling circuit means for processing said first and second enabling signals, and for turning said second switching means on or off in response thereto;

key code emitting means including a code generator having several switches for designating a code and a parallel-in/serial-out shift register for storing and outputting a code signal corresponding to the code designated by the switches;

key code receiving means for receiving the code signal emitted by the key code emitting means and detecting the code contained in the code signal;

memory means for storing a specific code; and switching control means for comparing the code detected by the key code receiving means against the specific code to determine a match/mismatch therebetween, and once a match is found, said switching control means causing said switching driver means to turn said second switching means on by said switching control means outputting said first and second enabling signals to said switching driver means.

2. An ignition system for a vehicle comprising:

power switching means being selectable in a first mode to activate an ignition circuit of said vehicle, and being selectable in a second mode to deactivate said ignition circuit;

spark voltage generating means including a primary and a secondary coil;

first switching means for intermittently passing a current through the primary coil in order to generate a spark voltage;

means for applying a voltage induced across the secondary coil to the spark plugs of an engine;

second switching means connected to control a current in said primary coil of said spark voltage generating means for controlling the generation of a spark voltage;

switching driver means for receiving simultaneously, a first enabling signal and a second enabling signal, said switching driver means having enabling circuit means for processing said first and second enabling signals, and for turning said second switching means on or off in response thereto;

key code emitting means including a code generator having several switches for designating a code and a parallel-in/serial-out shift register for storing and outputting a code signal burst corresponding to the code designated by the switches;

key code receiving means for receiving the code signal burst emitted by the key code emitting means and detecting the code contained in the code signal;

memory means for storing a specific code; and switching control means for comparing the code detected by the key code receiving means against the specific code to determine a match/mismatch therebetween, and once a match is found, said switching control means causing said switching driver means to turn said second switching means on by said switching control means outputting said first and second enabling signals to said switching driver means, said switching control means continuing to output said first and second enabling signals and causing said second switching means to remain on until said power switching means is selected from said first mode to said second mode.

3. An ignition system as claimed in claim 2, wherein said key code emitting means is removable from said vehicle and transmits said code signal burst as wireless signal transmissions, and wherein said key code receiving means is secured to said vehicle and receives said code signal burst as said wireless signal transmission.

* * * * *